United States Patent [19]

Stark

[11] Patent Number: 5,602,193
[45] Date of Patent: Feb. 11, 1997

[54] AQUEOUS DISPERSIONS OF EPOXY RESINS

[75] Inventor: Charles J. Stark, Houston, Tex.

[73] Assignee: Shell Oil Company, Houston, Tex.

[21] Appl. No.: 551,206

[22] Filed: Oct. 31, 1995

[51] Int. Cl.$^6$ .............................. C08K 3/20; C08L 63/00
[52] U.S. Cl. ...................... 523/403; 523/402; 523/427; 525/524; 525/533; 528/103; 528/103.5; 528/110
[58] Field of Search ..................... 523/402, 403, 523/427; 525/524, 533; 528/103, 103.5, 110

[56] References Cited

U.S. PATENT DOCUMENTS

| | | | |
|---|---|---|---|
| 3,342,858 | 9/1967 | Fuhrmann et al. | 260/531 |
| 3,816,365 | 6/1974 | Schmid et al. | 260/22 D |
| 3,929,873 | 12/1975 | Gammans | 260/531 |
| 4,092,295 | 5/1978 | Takamori et al. | 260/47 |
| 4,256,916 | 3/1981 | Morris et al. | 562/537 |
| 4,315,044 | 2/1982 | Elmore et al. | 427/386 |
| 4,415,682 | 11/1983 | Becker | 523/403 |
| 4,608,406 | 8/1986 | Williams, Jr. et al. | 523/424 |
| 4,952,645 | 8/1990 | Mulhaupt et al. | 528/110 |
| 4,987,163 | 1/1991 | Becker et al. | 523/414 |
| 5,064,880 | 11/1991 | Rao et al. | 523/403 |
| 5,095,051 | 3/1992 | Chung et al. | 523/417 |
| 5,118,729 | 6/1992 | Piechocki | 523/404 |
| 5,132,374 | 7/1992 | Reischmann et al. | 525/415 |
| 5,140,069 | 8/1992 | Mulhaupt et al. | 525/109 |
| 5,250,727 | 10/1993 | Fried | 562/540 |
| 5,386,008 | 1/1995 | Dubois et al. | 528/87 |
| 5,459,180 | 10/1995 | Pfeil et al. | 523/403 |

FOREIGN PATENT DOCUMENTS

0497404A1 8/1992 European Pat. Off..

OTHER PUBLICATIONS

Related Copending Case 08/361074.

*Primary Examiner*—John C. Bleutge
*Assistant Examiner*—Randy Gulakowski
*Attorney, Agent, or Firm*—Yukiko Iwata; Dean F. Vance

[57] ABSTRACT

A stable aqueous emulsions of epoxy resins are provided using an epoxy-functional polyether having the formula:

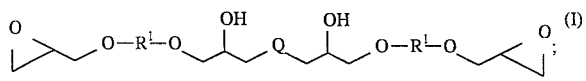

-continued

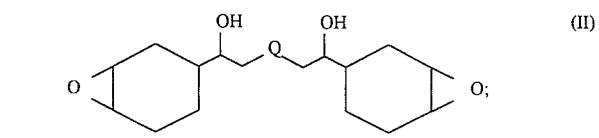

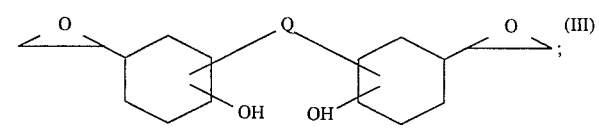

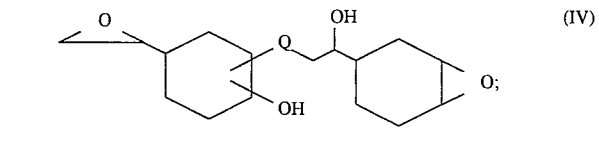

or

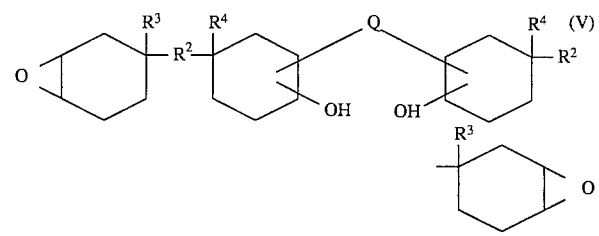

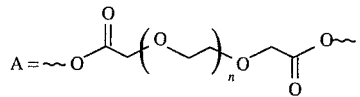

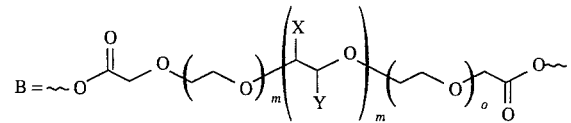

wherein Q is A or B, $R^1$ is independently a divalent hydrocarbon group, $R^2$ is a divalent aliphatic group optionally containing ether or ester groups or together with $R^3$ or $R^4$ form a spiro ring optionally containing heteroatoms, and $R^3$ and $R^4$ are independently hydrogen or $R^3$ or $R^4$ together with $R^2$ form a spiro ring optionally containing heteroatoms such as oxygen, X and Y are independently hydrogen, methyl or ethyl group with the provision that if X is methyl or ethyl, Y is hydrogen or if Y is methyl or ethyl, X is hydrogen and n+m+o is a positive real number from about 15 to 450, and where Q is B, n+o is a real number in an amount effective to provide emulsifying property.

12 Claims, No Drawings

AQUEOUS DISPERSIONS OF EPOXY RESINS

FIELD OF THE INVENTION

This invention relates to aqueous dispersions of epoxy resins. In one aspect, the invention relates to improved aqueous dispersions of epoxy resins which provide improved coating properties.

BACKGROUND OF THE INVENTION

Aqueous dispersions of epoxy resins have been known for many years. However, the performance of these dispersions as elements of coatings has been viewed as inferior to their solvent borne counterparts. It is known that the surfactants employed to render the epoxy component emulsifiable such as nonylphenol ethoxylates, alkylphenol initiated poly(oxyethylene) ethanols, alkylphenol initiated poly(oxypropylene) poly(oxyethylene) ethanols, and block copolymers containing an internal poly(oxypropylene) block and two external poly(oxyethylene) ethanol blocks readily migrate to surface interfaces where, it is speculated, they deleteriously affect film performance. Therefore, there is a continuous need for improved aqueous dispersions of epoxy resins which provide good coating properties.

SUMMARY OF THE INVENTION

According to the invention, an aqueous dispersion of an epoxy resin is provided comprising:

a) water;

b) at least one epoxy resin having a functionality of greater than about 1.0 epoxide group per molecule;

c) from about 1 to about 20 weight percent, based on the epoxy resin of at least one epoxy-functional polyether having the formula:

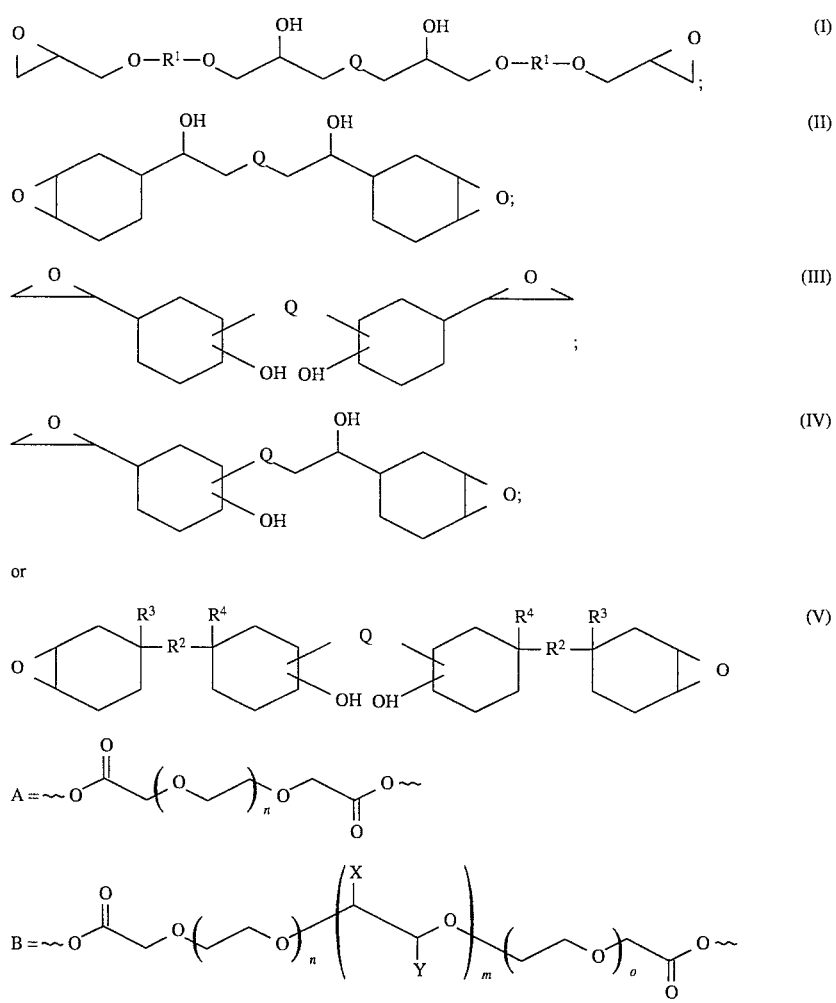

wherein Q is A or B, $R^1$ is independently a divalent hydrocarbon group, $R^2$ is a divalent aliphatic group optionally containing ether or ester groups or together with $R^3$ or $R^4$ form a spiro ring optionally containing heteroatoms, and $R^3$ and $R^4$ are independently hydrogen or $R^3$ or $R^4$ together with $R^2$ form a spiro ring optionally containing heteroatoms such as oxygen, X and Y are independently hydrogen, methyl or ethyl group with the provision that if X is methyl or ethyl, Y is hydrogen or if Y is methyl or ethyl, X is hydrogen and n+m+o is a positive real number from about 15 to 450, and where Q is B, n+o is a real number in an amount effective to provide emulsifying property.

Further, curable epoxy resin compositions comprising these epoxy resin dispersions and water-compatible curing agents are provided.

DETAILED DESCRIPTION OF THE INVENTION

It has been found that by using a certain epoxy-functional polyether surfactant an effective aqueous epoxy resin emulsion can be formed having an average particle size of generally less than about 1 μm.

Epoxy-Functional Polyether Component

The epoxy-functional polyether surfactant useful in the invention can be represented by the formula:

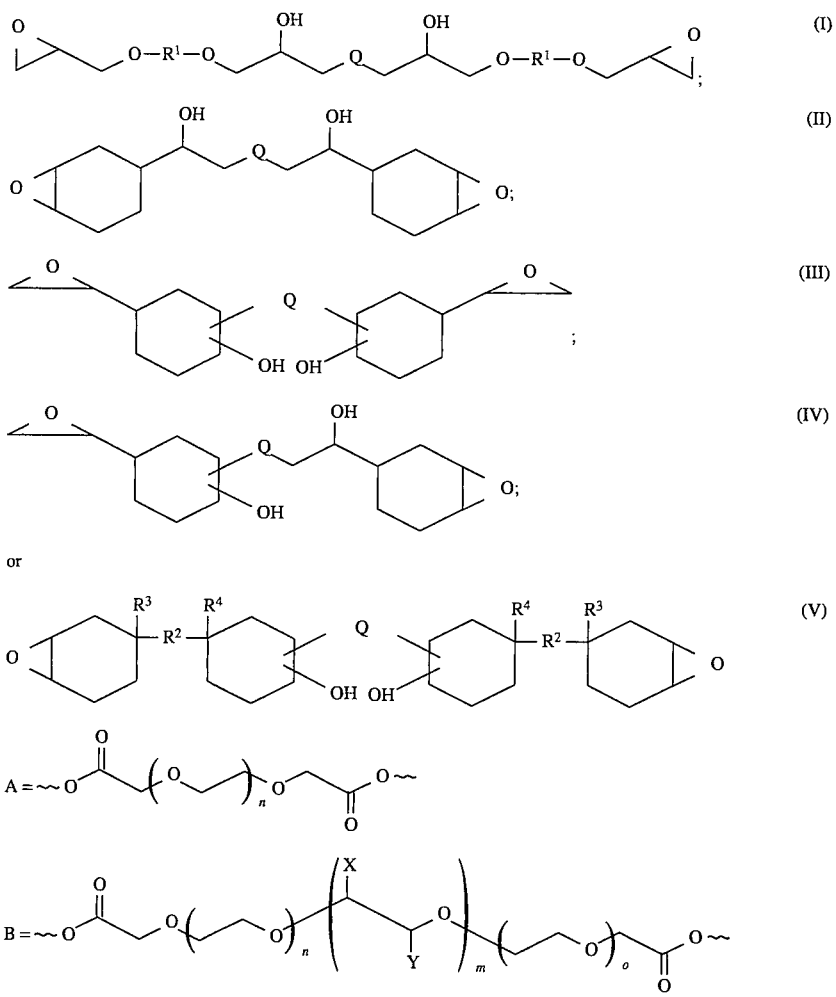

wherein Q is A or B, $R^1$ is independently a divalent hydrocarbon group, $R^2$ is a divalent aliphatic group optionally containing ether or ester groups or together with $R^3$ or $R^4$ form a spiro ring optionally containing heteroatoms, and $R^3$ and $R^4$ are independently hydrogen or $R^3$ or $R^4$ together with R: form a spiro ring optionally containing heteroatoms such as oxygen, X and Y are independently hydrogen, methyl or ethyl group with the provision that if X is methyl or ethyl, Y is hydrogen or if Y is methyl or ethyl, X is hydrogen and n+m+o is a positive real number from about 15 to 450, more preferably from about 45, to about 450, preferably to about 400 and where Q is B, n+o is a real number in an amount effective to provide emulsifying property, which is at least about 15, and m, n and o can independently be a positive real number from 0 to 450. The different location of the "OH" and "Q" bonding to the cycloaliphatic ring represents the different isomers formed by tile cycloaliphatic oxirane ring opening reaction. It can be appreciated that the acid "Q" moiety can be attached to either 3- or 4- position from $R^2$ in formula (V) or epoxy moiety in formula (III) or (IV). The epoxy-functional polyether surfactant preferably has a molecular weight within tile range of from about 1000, preferably from about 2000, to about 40,000, preferably to about 20,000.

The epoxy-functional polyether component can be produced by reacting (a) a carboxylic acid having the formula:

$$H-Q-H \qquad (VI)$$

wherein Q is defined above and (b) an epoxy resin having a functionality of at least about 1.5 epoxide group per molecule.

The carboxylic acid is contacted with the epoxy resin under conditions effective to react the acid group and the epoxide group. Typically, the mole ratio of the carboxylic acid to epoxy resin is within the range of about 1:2, more preferably from about 1:3 to about 1:50, preferably to about 1:10. The reaction is typically carried out at a temperature from ambient temperature to an elevated temperature sufficient to react the acid group and the epoxide group preferably within the range of from about 25° C. to about 150° C. for a time effective to produce the reaction products. The progress of the reaction can be monitored and targeted to produce the desired product by measuring the acid equivalent weight and the epoxy equivalent weight of the reactant mixture. Generally, the reaction mixture is heated until an acid equivalent weight of the mixture indicates greater or equal than 99% of the original number of equivalents of acid is consumed, and at least an equivalent amount of epoxies is consumed which is generally one hour or greater. For cycloaliphatic epoxies, the monitoring of the course of reaction by following consumption of epoxy alone can be misleading, due to competing homopolymerization of this type of epoxy group. Preferably, this reaction is carried out in the presence of an catalyst.

The catalysts are bases or metal chelates such as, for example, ammonium compounds, phosphonium compounds, tertiary amines, and phosphines. Examples of more preferred catalysts include, for example, triphenylphosphonium acid acetate, ethyltriphenyl phosphonium iodide, benzyldimethylamine, triphenylphosphine, tributylamine, aluminum salicylates, tetramethylammonium hydroxide and the like. The amount of catalyst present is preferably from about 0.05 to about 2.0 weight percent based on the total weight of the epoxy resin and the carboxylic acid.

If desired the surfactant can be recovered from the reaction mixture or made "in-situ." To provide the surfactant in-situ in the desired epoxy resin component, the carboxylic acid can be reacted into the desired epoxy resin component. For the in-situ method, the epoxy resin should be present in an amount sufficient to provide unreacted epoxy resin component and the surfactant adduct. Further, to provide the surfactant in-situ in an advanced epoxy resin, the carboxylic acid can be reacted into the mixtures of diglycidyl ethers of dihydric phenols and phenolic compounds during advancement reaction or can be reacted into after the advancement reaction. Typically, about 3 to about 12 weight percent of carboxylic acid, based on epoxy resin or epoxy resin and phenolic compound, is used.

The preferred hydrophilic carboxylic acid can be produced by oxidation of a polyethylene glycol, polypropylene glycol, polybutylene glycol or a block copolymer of ethylene oxide and propylene oxide or polybutylene oxide ("polyalkylene glycol"). Preferably the polyalkylene glycol has a formula:

$$HO-CH_2-CH_2-D-CH_2-CH_2-OH \qquad (VII)$$

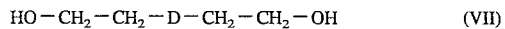

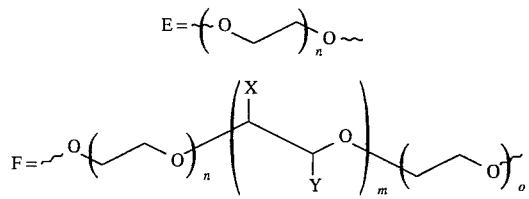

wherein D is E or F, X and Y are independently hydrogen, methyl or ethyl group with the provision that if X is methyl or ethyl, Y is hydrogen or if Y is methyl or ethyl, X is hydrogen and n, m, and o are positive real numbers defined above. Polyalkylene glycols generally contain a distribution of compounds with a varying number of oxyethylene units, n and o, and oxypropylene or oxybutylene units, m. To obtain a good emulsion, the number of oxyethylene units, n and o, is preferably at least 15. Generally, the quoted number of units is the whole number closest to the statistical average, and the peak of the distribution.

The carboxylic acid can be produced by oxidation of a corresponding polyalkylene glycols including, but not limited to, the processes described in U.S. Pat. No. 5,250,727. Generally, oxygen is added to the polyalkylene glycol in the presence of a free radical (e.g., 2,2,6,6-tetramethyl-1-piperidinyloxy) and an inorganic acid (e.g., nitric acid) to produce the carboxylic acid until substantially all of the alcohol groups are oxidized to carboxylic acid groups.

The hydrophobic epoxy resins can be any reactive epoxy resin having a 1,2-epoxy equivalency (functionality) preferably, on the average, greater than about 1.5 epoxide groups per molecule. The epoxy resin can be saturated or unsaturated, linear or branched, aliphatic, cycloaliphatic, aromatic or heterocyclic, and may bear substituents which do not materially interfere with the reaction with the carboxylic acid. Such substituents can include bromine or fluorine. They may be monomeric or polymeric, liquid or solid, but are preferably liquid or a low melting solid at room temperature. Suitable epoxy resins include glycidyl ethers prepared by reacting epichlorohydrin with a compound containing at least 1.5 aromatic hydroxyl groups carried out under alkaline reaction conditions. Examples of other epoxy resins suitable for use in the invention include diglycidyl ethers of dihydric compounds, and cycloaliphatic epoxies. Generally epoxy resins contain a distribution of compounds with a varying number of repeat units.

Preferred epoxy resins include, but are not limited to, those represented by the formula:

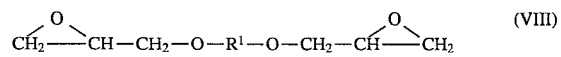

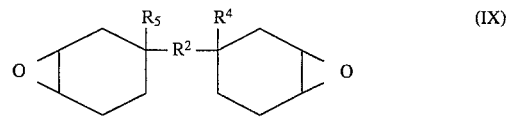

or

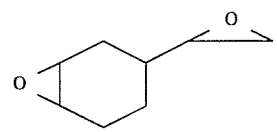

wherein $R^1$ is divalent aliphatic, divalent cycloaliphatic, divalent aryl, or divalent arylaliphatic group, preferably $R^1$ contains about 8 to 120 carbon atoms, $R^2$ is a divalent aliphatic group optionally containing ether or ester groups or together with $R^3$ or $R^4$ form a spiro ring optionally containing heteroatoms, and $R^3$ and $R^4$ are independently hydrogen or $R^3$ or $R^4$ together with $R^2$ form a spiro ring optionally containing heteroatoms such as oxygen. The term divalent aliphatic group, aliphatic or cycloaliphatic includes compounds having oxygen and/or sulfur atoms on the backbone. For example, $R^2$ can be a divalent cycloaliphatic group having the formula

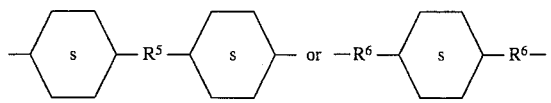

wherein $R^5$ and $R^6$ are each independently an alkylene group, or a divalent arylaliphatic group having the formula

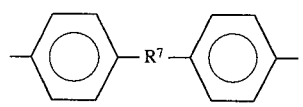

wherein $R^7$ is an alkylene group.

Preferably the epoxy resin is a diglycidyl ether of a dihydric phenol, diglycidyl ether of a hydrogenated dihydric phenol, an aliphatic glycidyl ether, or a cycloaliphatic epoxy.

Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl)propane (bisphenol-A); 2,2-bis(4-hydroxy-3-tert-butylphenyl) propane 1,1-bis(4-hydroxyphenyl) ethane; 1,1-bis (4-hydroxphenyl) isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols includes advancement products of the above diglycidyl ethers of dihydric phenols with phenolic compounds such as bisphenol-A, such as those described in U.S. Pat. Nos. 3,477,990 and 4,734,468.

Diglycidyl ethers of hydrogenated dihydric phenols can be produced, for example, by hydrogenation of dihydric phenols followed by glycidation reaction with an epihalohydrin in the presence of a Lewis acid catalyst and subsequent formation of the glycidyl ether by reaction with sodium hydroxide. Examples of suitable dihydric phenols are listed above.

Aliphatic glycidyl ethers can be produced, for example, by reacting an epihalohydrin with an aliphatic diol in the presence of a lewis acid catalyst followed by conversion of the halohydrin intermediate to the glycidyl ether by reaction with sodium hydroxide. Examples of preferred aliphatic glycidyl ethers include those corresponding to the formulas:

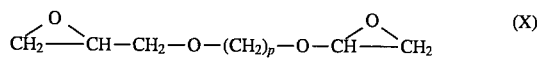 (X)

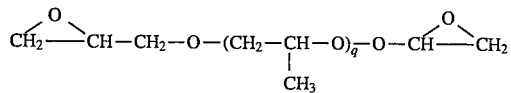 (XI)

wherein:

p is an integer from 2 to 12, preferably from 2 to 6; and q is an integer from 4 to 24, preferably from 4 to 12.

Examples of suitable aliphatic glycidyl ethers include for example, diglycidyl ethers of 1,4 butanediol, neopentyl glycol, cyclohexane dimethanol, hexanediol, polypropylene glycol, and like diols and glycols; and triglycidyl ethers of trimethylol ethane and trimethylol propane.

Cycloaliphatic epoxies can be produced by epoxidizing a cycloalkene-containing compound with greater then one olefinic bond with peracetic acid. Examples of the preferred cycloaliphatic epoxies include those corresponding to the formula:

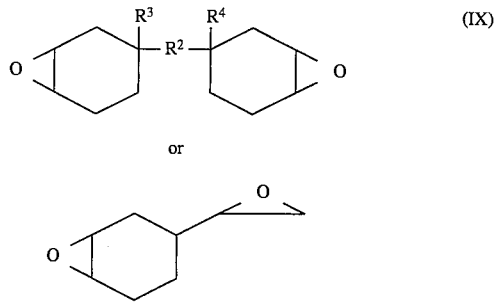

wherein $R^2$ is a divalent aliphatic group optionally containing ether or ester group(s) or together with $R^3$ or $R^4$ form a spiro ring optionally containing heteroatoms, and $R^9$ and $R^{10}$ are independently hydrogen or $R^3$ or $R^4$ together with $R^2$ form a spiro ring optionally containing heteroatoms such as oxygen, preferably $R^2$ contains from about 1 to about 20 carbon atoms. Examples of cycloaliphatic epoxies include, for example, 3,4-epoxycyclo-hexylmethyl-(3,4-epoxy)cyclohexane carboxylate, dicycloaliphatic diether diepoxy [2-(3,4-epoxy)cyclohexyl-5,5-spiro(3,4-epoxy)-cyclohexane-m-dioxane], bis(3,4-epoxycyclohexylmethyl)adipate, and vinylcyclohexene dioxide [4-(1,2-epoxyethyl)-1,2-epoxycyclohexane]. Cycloaliphatic epoxies include compounds of the formulas:

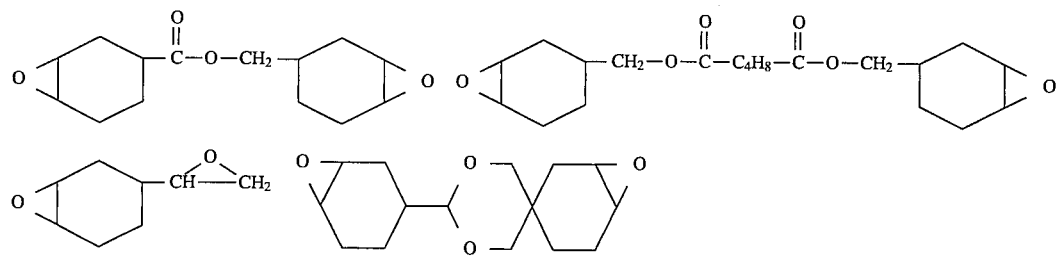

Commercial examples of preferred epoxy resins include, for example, EPON® Resins DPL-862, 828, 826, 825, 1001, EPONEX® Resin 1510, HELOXY® Modifiers 107, 67, 68, and 32 all available from Shell Chemical Company and Union Carbide Epoxy Resins ERL-4221, -4289, -4299, -4234 and -4206.

The hydrophilic carboxylic acid is contacted with the hydrophobic epoxy resin under conditions effective to react the acid group and the epoxide group and to produce the epoxy-functional polyethers.

Epoxy Resin Component

The epoxy resin component can be any epoxy resin having a functionality of greater than about 1.0 epoxide group per molecule, preferably at least about 1.2 epoxide group per molecule. These epoxy resins include those mentioned above for use in preparing the surfactant. Suitable epoxy resins include glycidyl ethers prepared by reacting epichlorohydrin with a compound containing, on the average, greater than one hydroxyl group carried out under alkaline reaction conditions. Examples of epoxy resins suitable for use in the invention include in addition to the epoxy resins mentioned above, polyglycidyl esters of polycarboxylic acids, and glycidylmethacrylate-containing acrylic resin. Polyglycidyl esters of polycarboxylic acids are mentioned below.

Aqueous Epoxy Resin Dispersions

In a typical aqueous dispersion of the invention useful for coating applications, the amount of the epoxy resin component (b) is from about 30 to about 70 percent by weight, preferably from about 55 to about 65 percent by weight, based on the total dispersion. Generally, a) water and b) an epoxy resin having a functionality of greater than about 1.0 epoxide group per molecule are mixed under conditions effective to provide an oil-in-water emulsion in the presence of c) from about 3, preferably from about 4, more preferably from about 6, to about 20, most preferably to about 10 weight percent, based on the epoxy resin of at least one epoxy-functional polyether surfactant mentioned above. One 15 or more epoxy-functional polyether surfactant can be used. It has been found that the invention provides a stable good aqueous dispersion having an average particle size of preferably less than about 2 μm, more preferably less than about 1 μm.

The epoxy resin coating composition of the invention may include other additives, such as elastomers, stabilizers, extenders, plasticizers, pigments, pigment pastes, antioxidants, leveling or thickening agents, defoaming agents and/or wetting agents, reactive diluents, fillers, catalysts, and the like. The aqueous dispersion can contain an monocpoxide diluent as an reactive diluent.

Preferable reactive diluents are those which contain a water-immiscible $C_{8-20}$ aliphatic monoepoxide. The monoepoxide component can contain alicyclic and aromatic structures, as well as halogen, sulfur, phosphorus, and other such heteroatoms. Reactive diluents can be, for example, epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is glycidyl ether of monohydric $C_{8-14}$ aliphatic alcohols.

Useful coating compositions can be obtained by mixing an epoxy resin curing agent with the aqueous epoxy resin dispersion mentioned above.

Curing Agent

The epoxy resin curing agent can be any curing agent effective to cure (or crosslink) the epoxy resin dispersed in the aqueous solution. These curing agents are generally water compatible (i.e., dilutable and/or dispersable). Suitable curing agents for use with the dispersions include those typically employed with epoxy resins, such as aliphatic, araliphatic and aromatic amines, polyamides, amidoamines and epoxy-amine adducts. They exhibit varying levels of compatibility with water, depending upon the nature of the starting materials employed for their preparation. In many cases, partial ionization with acetic acid, propionic acid and the like is required to effect or improve water compatibility or emulsifiability.

Preferably for curing at room temperature or lower temperatures an epoxide equivalent to amine hydrogen equivalent ratio of from about 1:0.75 to about 1:1.5 are generally employed. Suitable polyalkylene amines curing agents are those which are soluble or dispersible in water and which contain more than 2 active hydrogen atoms per molecule such as diethyleneamine, triethylenetetramine, tetraethylenepentamine, etc. Other suitable curing agents include, for example, 2,2,4- and/or 2,4,4-trimethylhexamethylenediamine, 1,6-hexanediamine. 1-ethyl-1,3-propanediamine, 2,2(4), 4-trimethyl- 1,6-hexanediamine, bis(3-aminopropyl)piperazine, N-aminoethylpiperazine, N,N-bis(3-aminopropyl)ethylenediamine, 2,4(6)-toluenediamine and also cycloaliphatic amines such as 1,2-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophoronediamine, norboranediamine, 4,4'-diaminodicyclohexylmethane, 4,4'-diaminodicyclohexylmethane, 4,4'-diaminodicyclohexylpropane, 2,2-bis(4-aminocyclohexyl)propane, 3,3'-dimethyl-4,4'-diaminodicyclohexylmethane, 3-amino-1-cyclohexaneaminopropane, 1,3- and 1,4-bis(aminomethyl)cyclohexane. As araliphatic amines, in particular those amines are employed in which the amino groups are present on the aliphatic radical for example m- and p-xylylenediamine or their hydrogenation products. The amines may be used alone or as mixtures.

Suitable amine-epoxide adducts are, for example, reaction products of diamines such as, for example, ethylenediamine, diethylenetriamine, triethylenetetramine, m-xylylenediamine and/or bis(aminomethyl)cyclohexane with terminal epoxides such as, for example, polyglycidyl ethers of polyhydric phenols listed above.

Polyamidoamine curing agents can be obtained, for example by reacting polyamines with polycarboxylic acids such as dimerized fatty acids. In addition to the above polyamines, the water-soluble polyoxypropylenediamines with molecular weights of 190 to 2,000 and also the readily water-dispersible curing agents, such as are described in the German Auslegeschrift 2,332,177 and the European Patent 0,000,605, for example, modified amine adducts are preferably employed. To cure the coating to completion, the coatings obtainable from these dispersions may also be heated for 30 to 120 minutes at an elevated temperature, preferably within the range of 50° C. to about 120° C.

For higher temperature cure applications, aminoplast resins can be used as curing agents for epoxy resins having a high equivalent weight, e.g. greater than 700. Generally, from 5, preferably from 10, to about 40, preferably to about 30 weight percent of aminoplast resins, based on the combined weight of the epoxy resin and aminoplast resin, is used. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Examples of aldehydes include formaldehyde acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins.

Commercial examples of water-compatible curing agents include EPI-CURE® 8535, 8535, 8537, 8290 and 9292 curing agents (available from Shell Chemical Co.), ANQUAMINE 401, Casamid 360 and 362 curing agents (Air Products); EPILINK 381 and DP660 curing agents (Akzo Chemical Co.); Hardener HZ350, Hardeners 92-113 and 92-116 (Ciba Geigy); BECKOPOX EH659W, EH623W, VEH2133W curing agents (Hoechst Celanese) and EPOTUF 37-680 and 37-681 curing agents (Reichhold Chemical Co.).

The curable epoxy resin composition can be cured at a temperature within the range of from about 5° C., preferably from about 20° C., to about 200° C., preferably to about 175° C. for a time effective to cure the epoxy resin.

The aqueous dispersions of the instant invention and curing agents described above can serve as components of paints and coatings for application to substrates such as, for example, metal and cementitious structures. To prepare such paints and coatings, these resins are blended with primary, extender and anti-corrosive pigments, and optionally, additives such as surfactants, antifoam agents, rheology modifiers and mar and slip reagents. The selection and amount of these pigments and additives depends on the intended application of the paint and is generally recognized by those skilled in the art.

Examples of primary pigments include rutile titanium dioxide, such as KRONOS® 2160(Kronos, Inc.) and TI-Pure® R-960 from Du Pont, buff titanium dioxide, red iron oxide, yellow iron oxide and carbon black. Examples of extender pigments include calcium meta silicate, such as 10ES WOLLASTOKUP®(NYCO Minerals, Inc.), barium sulfate, such as SPARMITE®(Harcros Pigments, Inc.) and aluminum silicate, such as ASP®170(Englehard Corp.). Examples of anticorrosive pigments include calcium strontium phosphosilicate, such as HALOX SW111 (Halox Pigments), zinc ion modified aluminum triphosphate, such as K-WHITE®84(Tayca Corp.) and basic aluminum zinc phosphate hydrate, such as HEUCOPHOS®ZPA(Heuco Tech, Ltd.).

Additional surfactants can be included in waterborne epoxy paints and coatings to improve both pigment and substrate wetting. Such surfactants are typically non-ionic, examples of which include TRITON® X-100 and TRITON X-405(Union Carbide), PLURONIC F-88 (BASF) and SURFYNOL® 104(Air Products and Chemicals).

Anti-foam agents and defoamers suppress foam generation during manufacture of the paint or coating. Useful defoamers include DREWPLUS®L-475(Drew Industrial Div.), DE FO®P1-4 Concentrate(Ultra Additives) and BYK®033 (BYK-Chemie).

Rheological additives are employed to obtain proper application properties. There are three types of additives that provide the desired thickening and shear thinning required for waterborne epoxy coatings; namely, hydroxyethylcellulose, organically modified hectorite clays and associative thickeners. NATROSOL®250 MBR and NATROSOL Plus-(Aqualon) are examples of modified hydroxyethylcellulosics and BENTONE®LT(RHEOX, Inc.) is representative of a hectorite clay. ACRYSOL®QR-708(Rohm and Haas Co.) is an often useful associative thickener.

Mar and slip agents improve early resistance to abrasion from scrubbing or light foot traffic. Polydimethylsiloxanes and polyethylene waxes are used in this regard. An example of a commercially available wax is MICHEM LUBE®182(MICHELMAN, INC.).

The curable paint and coating compositions can be applied to a substrate by brush, spray, or rollers.

ILLUSTRATIVE EMBODIMENT

The following illustrative embodiments describe the process of the invention and are provided for illustrative purposes and are not meant as limiting the invention.

Examples 1-4 demonstrate the preparation of the epoxy-functional polyether emulsifier and examples 5-8 demonstrate the use of the epoxy-functional polyether emulsifier in the formation of the aqueous dispersions (emulsions).

EPON® Resin 828 (a diglycidyl ether of dihydric phenol having epoxy equivalent weight of 187-188) was obtained from Shell Chemical Company.

Testing Methods

I. Viscosity Viscosities were determined on the obtained emulsion or dispersion by means of a Brookfield Synchro Lectric Viscometer from Brookfield Engineering Laboratories.

II. Particle Size The determination of emulsion and dispersion particle sizes was accomplished with a Brookhaven Bi-DCP Particle Sizer from Brookhaven Instruments Corporation.

III. Weight per Epoxide The weight per epoxide(WPE) of all products was determined by drying a weighed amount of sample by means of azeotropic distillation with methylene chloride then titrating the residue by known methods and correcting for percent solids to determine the WPE at 100 % solids content.

Preparation of Surfactant

EXAMPLE 1.

Preparation of an 8000 MW α-(Carboxymethyl)- ω(Carboxymethoxy)-poly(oxy-1,2-ethanediyl)

To a 2000 mL, four neck flask, fitted with a stirrer, thermocouple, air sparge tube, condenser and addition funnel, was added 500 grams (0.125 equiv.) of polyethylene glycol of approximately 8000 Mn (Aldrich Chemical Co.), 19.5 grams (0.125 equiv) of 2,2,6,6-tetramethyl-1-piperidinyloxy, free radical (Aldrich Chemical Co., TEMPO, free radical) and 1000 grams of dichloromethane. The mixture was heated to reflux, then air was introduced into the mixture through the sparge tube. Next, concentrated nitric acid (7.8 grams) was added over 15 minutes and the mixture was held at reflux for 17 hours. After this time, 550 grams of 2-propanol were added and the mixture stirred briefly. Volatiles were then removed by means of a rotary evaporator. The residue, 510.9 g, solidified upon cooling. The solid was washed with isopropanol, then ground to a powder and dried in a vacuum oven at 40° C. to a constant weight of 484 grams. NMR Analysis indicated complete conversion of hydroxyl to carboxyl functionality. The solid possessed an acid equivalent weight of 4168.

EXAMPLE 2

Preparation of a Epoxy-Functional Polyether Surfactant from Acid-functional Polyether of Example A and EPON® Resin 828.

To a 500 mL, 4-neck flask, equipped with a stirrer, condenser, temperature probe and positive nitrogen seal, were added EPON® Resin 828 (131.4 g, 0.7027 eq.), the acid terminated polyethylene glycol prepared as described in EXAMPLE 1 (118.6 g, 0.0285 eq.) and ethyltriphenylphosphonium iodide (0.25 g). The mixture was heated to 125° C. and maintained at that temperature until its WPE reached 369 (theoretical WPE at 100% conversion=371), whereupon the mixture was isolated.

EXAMPLE 3

Preparation of an 3400 MW α-(Carboxymethyl)- ω(Carboxymethoxy)-poly(oxy-1,2-ethanediyl)

To a 3000 mL, four neck flask fitted with a stirrer, thermocouple, air sparge tube, condenser and addition funnel, was added 640 grams (0.4 equiv.) of polyethylene glycol of approximately 3400 Mn (Aldrich Chemical Co.), 62.4 grams (0.4 equiv) of 2,2,6, 6-tetramethyl-1-piperidinyloxy, free radical (Aldrich Chemical Co., TEMPO, free radical) and 2000 grams of dichloromethane. The mixture was heated to reflux, then air was introduced into the mixture through the sparge tube. Next, concentrated nitric acid (62.4 grams) was added over 22 minutes and the mixture was held at reflux for 19.5 hours. Volatiles were then removed by means of a rotary evaporator. The residue, 673.3 g, solidified upon cooling. The solid was ground with dry ice, washed with 2-propanol, and dried in a vacuum oven at 47° C. to a constant weight of 554 grams. NMR Analysis indicated complete conversion of hydroxyl to carboxyl functionality. The solid possessed an acid equivalent weight of 1688.

EXAMPLE 4

Preparation of a Epoxy-Functional Surfactant from Acid-functional Polyether of Example 3 and EPON® Resin 828.

To a 500 mL. 4-neck flask, equipped with a stirrer, condenser, temperature probe and positive nitrogen seal, were added EPON® Resin 828 (131.4 g, 0.7027 eq.), the acid terminated polyethylene glycol prepared as described in EXAMPLE 3 (118.6 g, 0.0703 eq.) and ethyltriphenylphosphonium iodide (0.25 g). The mixture was heated to 125° C. and maintained at that temperature until its WPE reached 405 (theoretical WPE at 100% conversion=396), whereupon the mixture was isolated.
Preparation of Emulsion (Aqueous Dispersion)

EXAMPLE 5

Preparation of an Emulsion, Utilizing the Surfactant of EXAMPLE 2.

EPON® Resin 828 (266.6 g, 1.43 eq.), bisphenol A (82.8 g, 0.726 eq.) and ethyltriphenylphosphonium iodide (0.24 g) were added to a 1 L resin kettle, equipped with a stirrer, temperature probe and nitrogen seal and warmed to 120° C., whereupon an exotherm occurred. The reaction was maintained at 160° C. subsequent to the exotherm, until the WPE reached 501, whereupon it was cooled to 120° C. The surfactant of EXAMPLE 2 was added (50.6 g), then the mixture was allowed to cool to 84° C. and Ektasolve®EP (32.4 g) was added. Deionized water (108 g) was then added at 5 mL/min. allowing the mixture to cool to 70° C. After completion of addition, the mixture inverted to an oil-in-water emulsion. One hour after inversion, HELOXY® Modifier 7 (7.27 g) was added, followed by 138.5 g of water and 43 g Ektasolve EP. The number average particle size of the resultant emulsion was 0.611 micron: The weight average particle size was 0.811 micron. The WPE was 768.

EXAMPLE 6

Preparation of an Emulsion, Utilizing the Surfactant of EXAMPLE 4.

EPON® Resin 828 (267 g, 1.43 eq.), bisphenol A (83.1 g, 0.729 eq.) and ethyltriphenylphosphonium iodide (0.21 g) were added to a 1 L resin kettle, equipped with a stirrer, temperature probe and nitrogen seal and warmed to 120° C., whereupon an exotherm occurred. The reaction was maintained at 160° C. subsequent to the exotherm, until the WPE reached 501, whereupon it was cooled to 104° C. The surfactant of EXAMPLE 5 was added (49.8 g), then the mixture was allowed to cool further to 94° C. and Ektasolve®EP(32.8 g) was added. Deionized water (85.1 g) was then added at 5 mL/min. allowing the mixture to cool to 70° C. After completion of addition, the mixture inverted to an oil-in-water emulsion. The mixture was stirred at 600 rpm for about 2 hours, during which time the temperature was allowed to decrease to 64° C. Next, HELOXY® Modifier 7 (7.27 g) was added, followed by 172.9 g of water and 24.3 g Ektasolve EP. The number average particle size of the resultant emulsion was 0.646 micron: The weight average particle size was 1.13 microns. The viscosity was 400 cP (Brookfield No.5 spindle @ 50 rpm).

EXAMPLE 7

Preparation of an 3400 MW α-(Carboxymethyl)- ω(Carboxymethoxy)-poly(oxy-1,2-ethanediyl)

To a 2000 mL, four neck flask, fitted with a stirrer, thermocouple, air sparge tube, condenser and addition funnel, was added 340 grams (0.2 equiv.) of polyethylene glycol of approximately 3400 Mn (Aldrich Chemical Co.), 31.2 grams (0.2 equiv) of 2,2,6, 6-tetramethyl-1-piperidinyloxy, free radical(Aldrich Chemical Co., TEMPO, free radical and 1000 grams of dichloromethane. The mixture was heated to reflux, and air was introduced into the mixture through the sparge tube; then, concentrated nitric acid (31.2 grams) was added over 20 minutes. The mixture was held at reflux for 9.5 hours, 440 g of 2-propanol were added. This mixture was stirred for one hour, then volatiles were removed by means of a rotary evaporator. The residue,332 g, solidified upon cooling. $^{13}C$ NMR indicated complete conversion of hydroxyl functionality to acid functionality. The acid equivalent weight of the product was found to be 1741.

EXAMPLE 8

Preparation of an Emulsion by the "In-Situ" Method, Using the Oxidized Polyethylene Glycol of EXAMPLE 7

EPON® Resin 828 (291.8 g, 1.552 eq.), bisphenol A (84.2 g, 0.738 eq.) the oxidized polyethylene glycol of EXAMPLE 7 (24 g, 0.014 eq.) and ethyltriphenylphosphonium iodide(0.25 g) were added to a 1 L resin kettle, equipped with a stirrer, temperature probe and nitrogen seal and warmed to 144° C., whereupon an exotherm occurred. The reaction was maintained at 160° C. subsequent to the exotherm until the WPE reached 499, whereupon it was cooled to 136° C. Ektasolve®EP(50.98 g) was added, then the reaction was cooled further to 80° C. Deionized water (98.4 g) was then added slowly. allowing the mixture to cool to 75° C. After completion of addition, the mixture was cooled to 42° C. Inversion did not take place; therefore, 14 g water was added, whereupon inversion occurred. After stirring for 10 minutes, HELOXY® Modifier 7 (7.27 g) was added, followed by a blend of water (134.2 g) and Ektasolve EP (24.4 g). The number average particle size of the emulsion was found to be 0.695 micron: The weight average particle size was 0.853 micron. The WPE of the emulsion was 872 and the viscosity was 8400 cP.

I claim:

1. An aqueous dispersion comprising:
   a) water;
   b) at least one epoxy resin having a functionality of greater than about 1.0 epoxide group per molecule;
   c) from about 1 to about 20 weight percent, based on the epoxy resin of at least one epoxy-functional polyether as having the formula:

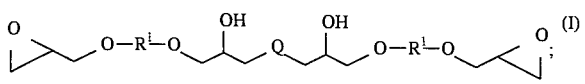

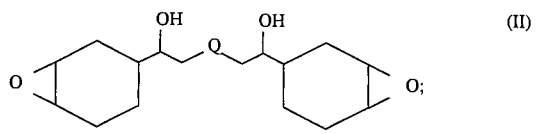

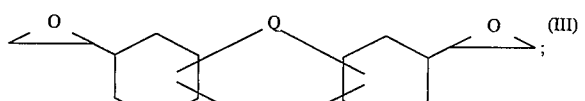

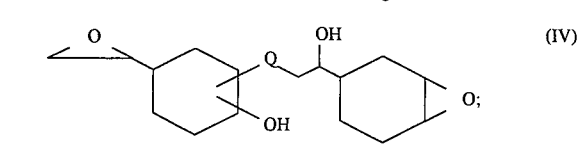

or

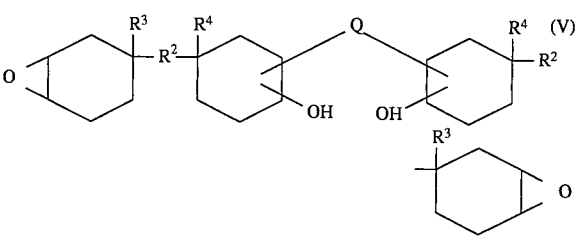

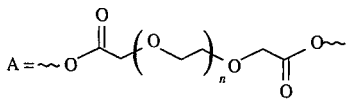

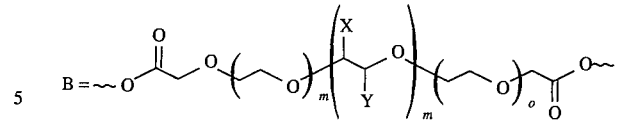

wherein Q is A or B, $R^1$ is independently a divalent hydrocarbon group, $R^2$ is a divalent aliphatic group optionally containing ether or ester groups or together with $R^3$ or $R^4$ form a spiro ring optionally containing heteroatoms, and $R^3$ and $R^4$ are independently hydrogen or $R^3$ or $R^4$ together with $R^2$ form a spiro ring optionally containing heteroatoms such as oxygen, X and Y are independently hydrogen, methyl or ethyl group with the provision that if X is methyl or ethyl, Y is hydrogen or if Y is methyl or ethyl, X is hydrogen and n+m+o is a positive real number from about 15 to 450, and where Q is B, n+o is a real number in an amount effective to provide emulsifying property.

2. The aqueous dispersion of claim 1 wherein the amount of the epoxy resin component (b) is from about 30 to about 70 percent by weight, based on the total dispersion.

3. The aqueous dispersion of claim 2 wherein the epoxy-functional polyether has a number average molecular weight within the range of about 1000 to about 40,000.

4. The aqueous dispersion of claim 3 wherein n+o is a real number of at least 15.

5. The aqueous dispersion of claim 1 wherein the epoxy resin has a functionality of at least about 1.2.

6. The aqueous dispersion of claim 2 further comprising an monoepoxide diluent.

7. The aqueous dispersion of claim 6 wherein the diluent comprises a water-immiscible $C_{8-20}$ aliphatic monoepoxide.

8. A curable epoxy resin composition comprising the aqueous dispersion of claim 1 and a water-miscible curing agent for the epoxy resin.

9. A coating composition comprising the aqueous dispersion of claim 1 and an epoxy resin curing agent.

10. A coating composition comprising the aqueous dispersion of claim 4 and an epoxy resin curing agent.

11. A coating composition comprising the aqueous dispersion of claim 6 and an epoxy resin curing agent.

12. A process for the preparation of an aqueous dispersion comprising mixing under conditions effective to provide an oil-in-water emulsion a) water and b) an epoxy resin having a functionality of greater than about 1.0 epoxide group per molecule in the presence of c) from about 1 to about 20 weight percent, based on the epoxy resin of at least one epoxy-functional polyether having the formula:

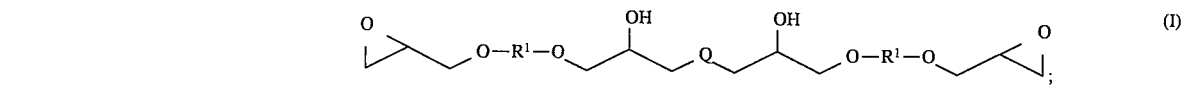

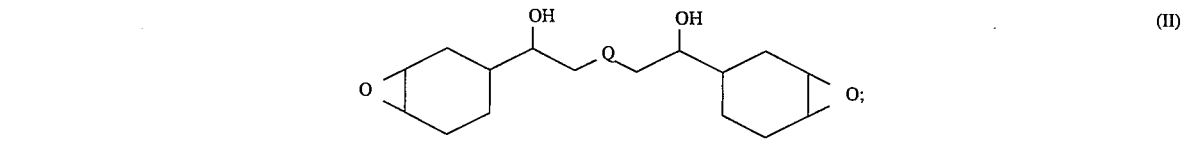

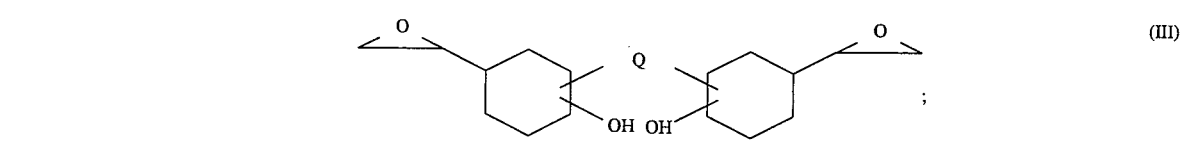

-continued

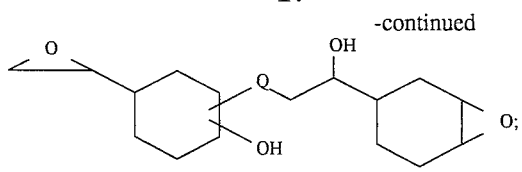
(IV)

or

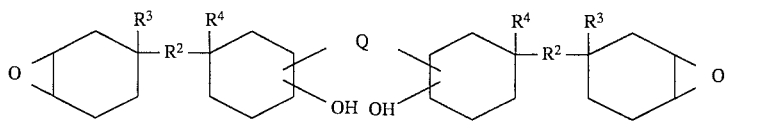
(V)

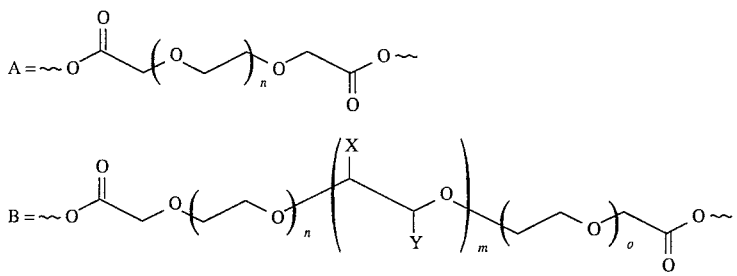

wherein Q is A or B, $R^1$ is independently a divalent hydrocarbon group, $R^2$ is a divalent aliphatic group optionally containing ether or ester groups or together with $R^3$ or $R^4$ form a spiro ring optionally containing heteroatoms, and $R^3$ and $R^4$ are independently hydrogen or $R^3$ or $R^4$ together with $R^2$ form a spiro ring optionally containing heteroatoms such as oxygen, X and Y are independently hydrogen, methyl or ethyl group with the provision that if X is methyl or ethyl, Y is hydrogen or if Y is methyl or ethyl, X is hydrogen and n+m+o is a positive real number from about 15 to 450, and where Q is B, n+o is a real number in an amount effective to provide emulsifying property.

* * * * *